Dec. 12, 1967        R. W. HOWARD        3,357,722

FLAT SIDED DUCT CONNECTOR

Filed Oct. 22, 1965

INVENTOR.
ROBERT W. HOWARD
BY David L. Rogers
AGENT

United States Patent Office 3,357,722
Patented Dec. 12, 1967

3,357,722
FLAT SIDED DUCT CONNECTOR
Robert W. Howard, Anaheim, Calif., assignor, by mesne assignments, to McDonnell Douglas Corporation, Santa Monica, Calif., a corporation of Maryland
Filed Oct. 22, 1965, Ser. No. 501,495
4 Claims. (Cl. 285—109)

ABSTRACT OF THE DISCLOSURE

A duct connector having resilient side portions and separate adjustable corner connections to compensate for any irregularities in the duct surface and thereby provide an air-tight seal.

This invention relates to a connector for ducts and more particularly to a duct connector for substantially rectangularly shaped ducts.

In the assembly of duct systems for the guiding and pasasge of air to and from furnaces, air blowers, heat exchangers, etc., the duct systems are formed of several separate sections connected together. It is desirable to connect the duct sections in such a manner as to have a leakage free connection which can be assembled with a minimum amount of time and effort.

The duct connector of this invention facilitates easy and quick connection of duct sections with the resulting connection providing an air-tight seal. The connector is capable of being used on misaligned or different size mating ducts, within reason, and still provide an air-tight joint. Further, the connector of this invention is flexible and utilizes the internal air pressure of the duct to effect the air-tight seal, therefore, small irregularities on the duct surface do not affect the seal quality. Last, the connector allows for easy removal and replacement of duct sections for reasons of maintenance and repair.

Briefly, the connector is formed of four separate side portions of sheet material. Each side portion is adjustably connected to a right-angled corner plate so that the four side portions substantially form a rectangle. Connected to each corner plate is a clamp portion which is adapted to force together the corner plates and the corner portions of the ducts. The side portions of the connector are formed to be resilient so the internal air pressure will force the side portions and the sides of the ducts together. The side portions of the connector are to be installed internally of and at the joint of the two mating ducts in a snug fitting relationship. The clamp portions located at each corner section hold the unit together.

Other and further important objects and features of the invention will become apparent from the following specification, appended claims and accompanying drawing, wherein:

FIGURE 1 is a pictorial view of the duct connector of this invention as applied;

FIG. 2 is a sectional view of the connector corner clamp taken along line 2—2 of FIG. 1;

FIG. 3 is a sectional view of the connector side portion taken along line 3—3 of FIG. 1; and FIG. 4 is a sectional view of the corner section of the connector taken along line 4—4 of FIG. 1.

In FIG. 1 there are shown ducts 10 and 12 adapted to be held together by the duct connector 14 of this invention. Connector 14 is constructed of four sidewall portions 16, 18, 20 and 22 connected together in a substantial rectangle shape at each of the four corners of the rectangle by corner portions 24. Corner portions 24 art slidably mounted on the sidewall portions 16, 18, 20 and 22 by means of fasteners 26. Fasteners 26 are rigidly secured to the corner portions 24 but movable within the sidewall portions 16, 18, 20 and 22 by means of a slot 28 formed adjacent each end of the sidewall portions. Washer 30 is placed under the head of each fastener 26 to prevent withdrawal of the fastener from its slot 28. Slots 28 are so formed as to only permit movement within the plane of the rectangle which forms the shape of the duct connector.

Corner portions 24, which are clearly shown in FIGS. 1, 2 and 4, contain a bottom plate portion 32 which is adapted to conform to the shape of the corner of each duct. Fastening means 26 near the ends of two adjacent sidewall portions are rigidly secured to the bottom plate portion 32. A bolt-type of fastener 34 is mounted through said bottom plate portion 32 near the apex. A top plate portion 36 is mounted exteriorly of said bottom plate portion 32, said fastener 34 extending therethrough. Fastener 34 when tightened force together plates 32 and 36 thereby creating a holding force. Edges of the ducts 10 and 12 are adapted to be inserted between plates 32 and 36 thereby being held by the holding force created by the tightening of the fastener 34.

The installation of the duct connector 14 is as follows: The sidewall portions 16, 18, 20 and 22, connected by bottom plate portions 32 are adjusted to abut interiorly the inside of one end of one of the mating ducts 10 or 12, with the top plate portion 36 abutting exteriorly of the ducts. The end of the other one of the ducts 10 or 12 is brought into corresponding alignment with the duct connector 14 so that each end of each duct 10 and 12 are aligned longitudinally, each contacting the duct connector 14 with the duct connector inserted therebetween. Fasteners 34 are tightened thereby binding the end of each of the ducts 10 and 12 to the duct connector 14. The sidewall portions 16, 18, 20 and 22 are formed of relatively thin sheet material so that the air pressure inside the ducts will tend to force the sidewall portions against the duct walls. To eliminate vibration "chatter" of the sidewall portions a small width of sponge rubber 38 or similar material may be applied to each sidewall portion where it contacts the ducts 10 and 12. Usually a channel member 40 is mounted exteriorly of each sidewall portion substantially the length thereof for the purpose of stiffening each sidewall portion. Otherwise, without channels 40 the connector would be too flexible. Tie rod 42 connects sidewall portions 16 and 20 to maintain the connector in the rectangle shape.

At times it may be desirable to enter the ducts for reasons of maintenance or to replace duct sections. To facilitate ease of entry, channel members 40, fasteners 26 and 34 are mounted more to one end of the connector 14 than the other end (see FIG. 1). Thereupon to enter the interior of the ducts 10 and 12, fasteners 34 are loosened and the connector 14 is slid longitudinally within duct 12 until the edge of duct 12 abuts channel 40 and the head of bolt-like fasteners 34. A finger plate 44 is mounted on each top plate portion 36 of early corner position 24 to facilitate ease of sliding the connector 14 within duct 12. Thereby, entry into the ducts 10 and 12 is obtained without removal of the duct connector 14.

Having thus described my connection as to one embodiment it is to be understood that the invention is not limited thereto, as many variations will be readily apparent to those skilled in the art and the invention is to be given its broadest possible interpretation with the terms of the following claims.

I claim:

1. A duct connector capable of connecting two separate aligned end to end duct sections in an air-tight unit comprising:

a side duct connector being formed of a plurality of sidewall portions, said sidewall portions including an area substantially equal to the area enclosed by said duct sections, said sidewall portions being flexible whereby pressure within said duct sections physically force said flexible sidewall portions against said duct sections;

corner portions connecting two adjacent sidewall sections, said corner portions having means to securely clamp said duct sections into a rigid unit; and said means to securely clamp said duct sections includes a bottom plate portion, said bottom plate portion being connected to said sidewall portions, a top plate portion mounted exteriorly of said bottom plate portion, portions of said ducts adapted to extend between said top and bottom plate portions, means connecting said top and bottom plate portions and capable of forcing together said top plate portion and said portions of said ducts and said bottom plate portion thereby creating a clamping force.

2. A duct connector as defined in claim 1 wherein:
said sidewall portions being four in number, said sidewall portions connected by said corner portions to form a substantially rectangularly shape.

3. A duct connector as defined in claim 1 wherein:
each of said sidewall portions having a stiffening means exteriorly mounted thereon, said stiffening means allowing flexibility of each sidewall portion but yet maintain the shape of the duct connector unit.

4. A duct connector as defined in claim 3 wherein:
said stiffening means and said means to clamp said top and bottom portions of said corner portions are mounted so as to be nearer one end of said connector than the other end of said connector, whereby a substantial portion of the length of said connector is capable of being slidable longitudinally within the interior of a duct section permitting entry to the interior of said duct sections.

References Cited

UNITED STATES PATENTS

| | | | |
|---|---|---|---|
| 2,353,883 | 7/1944 | Dickey | 285—398 X |
| 2,360,159 | 10/1944 | Peck | 285—371 |
| 2,814,508 | 11/1957 | Seamark | 285—371 X |
| 3,199,901 | 8/1965 | Jeppsson | 285—424 X |

FOREIGN PATENTS

| | | |
|---|---|---|
| 1,176,593 | 8/1964 | Germany. |

CARL W. TOMLIN, *Primary Examiner.*

R. G. BERKLEY, *Assistant Examiner.*